(12) United States Patent
Rotvold et al.

(10) Patent No.: US 8,737,244 B2
(45) Date of Patent: May 27, 2014

(54) WIRELESS SENSOR NETWORK ACCESS POINT AND DEVICE RF SPECTRUM ANALYSIS SYSTEM AND METHOD

(75) Inventors: Eric Darrell Rotvold, West Saint Paul, MN (US); Kelly Michael Orth, Apple Valley, MN (US); Daniel Clifford Carlson, St. Paul, MN (US); Theodore Henry Schnaare, Carver, MN (US); Joseph Citrano, III, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 798 days.

(21) Appl. No.: 12/955,072

(22) Filed: Nov. 29, 2010

(65) Prior Publication Data

US 2012/0134280 A1    May 31, 2012

(51) Int. Cl.
*H04L 12/26* (2006.01)

(52) U.S. Cl.
USPC ........... 370/252; 375/346; 455/63.1; 455/296

(58) Field of Classification Search
None
See application file for complete search history.

(56) References Cited

U.S. PATENT DOCUMENTS

| | | | |
|---|---|---|---|
| 5,048,323 A | 9/1991 | Stansfeld et al. |
| 5,502,639 A | 3/1996 | Fukunaga et al. |
| 5,560,021 A | 9/1996 | Vook et al. |
| 5,862,391 A | 1/1999 | Salas et al. |
| 6,049,205 A | 4/2000 | Taicher et al. |
| 6,185,208 B1 | 2/2001 | Liao |
| 6,301,527 B1 | 10/2001 | Butland et al. |
| 6,363,062 B1 | 3/2002 | Aaronson et al. |
| 6,374,311 B1 | 4/2002 | Mahany et al. |
| 6,485,175 B1 | 11/2002 | Nimberger et al. |
| 6,615,040 B1 | 9/2003 | Benveniste |
| 6,674,403 B2 | 1/2004 | Gray et al. |
| 6,711,166 B1 | 3/2004 | Amir et al. |
| 6,731,946 B1 | 5/2004 | Stanwood et al. |

(Continued)

FOREIGN PATENT DOCUMENTS

| | | |
|---|---|---|
| WO | 03023536 | 3/2003 |
| WO | 2007146565 | 12/2007 |

OTHER PUBLICATIONS

International Search Report and Written Opinion of the Patent Cooperation Treaty Office in international Application No. PCT/US20111062192, dated Jun. 22, 2012.

(Continued)

*Primary Examiner* — Khoa Huynh
(74) *Attorney, Agent, or Firm* — Kinney & Lange, P.A.

(57) ABSTRACT

A system for measuring and analyzing radio frequency power proximate and within a wireless field device mesh network. A centralized software module (CSWM) collects and analyzes values from one or more wireless devices of the wireless field device mesh network representing received RF power measurements on an assigned RF channel and values representing corresponding times of the received RF power measurements. Each wireless device measures received RF power on the assigned RF channel at times other than during reception of a signal resulting in transmission by the wireless device of either an acknowledgment signal or a non-acknowledgement signal. Values representing the received RF power measurements and the corresponding times of the received RF power measurements are determined from the stored received RF power measurements and corresponding times and then discarded. These values are stored within the wireless device until successfully reported. A network manager coordinates communication between the wireless devices and synchronizes the corresponding times of received RF power measurement throughout the wireless field device mesh network.

38 Claims, 4 Drawing Sheets

(56) References Cited

U.S. PATENT DOCUMENTS

| | | | |
|---|---|---|---|
| 6,741,554 B2 | 5/2004 | D'Amico et al. |
| 6,775,276 B1 | 8/2004 | Beser |
| 6,775,544 B2 | 8/2004 | Ficarra |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,891,838 B1 | 5/2005 | Petite et al. |
| 6,971,063 B1 | 11/2005 | Rappaport et al. |
| 6,990,189 B2 | 1/2006 | Ljubicich |
| 7,010,294 B1 | 3/2006 | Pyotsia et al. |
| 7,035,773 B2 | 4/2006 | Keyes et al. |
| 7,039,017 B2 | 5/2006 | Sherlock |
| 7,042,352 B2 | 5/2006 | Kates |
| 7,053,770 B2 | 5/2006 | Ratiu et al. |
| 7,075,890 B2 | 7/2006 | Ozer et al. |
| 7,075,892 B2 | 7/2006 | Grover et al. |
| 7,114,388 B1 | 10/2006 | French et al. |
| 7,130,915 B1 | 10/2006 | Rustad |
| 7,139,239 B2 | 11/2006 | McFarland |
| 7,155,228 B2 | 12/2006 | Rappaport et al. |
| 7,184,777 B2 | 2/2007 | Diener et al. |
| 7,187,277 B2 | 3/2007 | Kobayashi |
| 7,224,642 B1 | 5/2007 | Tran |
| 7,233,745 B2 | 6/2007 | Loechner |
| 7,246,045 B1 | 7/2007 | Rappaport et al. |
| 7,262,693 B2 | 8/2007 | Karschnia et al. |
| 7,277,401 B2 | 10/2007 | Kyperountas et al. |
| 7,327,998 B2 | 2/2008 | Kumar et al. |
| 7,339,489 B2 | 3/2008 | Arita et al. |
| 7,388,886 B2 | 6/2008 | Perkins et al. |
| 7,406,060 B2 | 7/2008 | Periyalwar et al. |
| 7,424,698 B2 | 9/2008 | Honary et al. |
| 7,436,790 B2 | 10/2008 | Todd et al. |
| 7,437,596 B2 | 10/2008 | McFarland |
| 7,440,436 B2 | 10/2008 | Cheng et al. |
| 7,460,865 B2 | 12/2008 | Nixon et al. |
| 7,468,969 B2 | 12/2008 | Zuniga |
| 7,489,282 B2 | 2/2009 | Lastinger et al. |
| 7,505,734 B2 | 3/2009 | Ratiu et al. |
| 7,515,608 B2 | 4/2009 | Yuan et al. |
| 7,519,043 B2 | 4/2009 | Porter et al. |
| 7,536,167 B2 | 5/2009 | Gollnick et al. |
| 7,554,941 B2 | 6/2009 | Ratiu et al. |
| 7,558,622 B2 | 7/2009 | Tran |
| 7,562,393 B2 | 7/2009 | Buddhikot et al. |
| 7,564,842 B2 | 7/2009 | Callaway, Jr. et al. |
| 7,581,053 B2 | 8/2009 | Sichner et al. |
| 7,596,461 B2 | 9/2009 | Hart et al. |
| 7,610,049 B2 | 10/2009 | Watanabe |
| 7,620,409 B2 | 11/2009 | Budampati et al. |
| 7,639,158 B2 | 12/2009 | Kobayashi |
| 7,640,007 B2 | 12/2009 | Chen et al. |
| 7,680,460 B2 | 3/2010 | Nelson et al. |
| 7,697,893 B2 | 4/2010 | Kossi et al. |
| 7,701,858 B2 | 4/2010 | Werb et al. |
| 7,705,729 B2 | 4/2010 | Broad et al. |
| 2002/0167954 A1 | 11/2002 | Highsmith et al. |
| 2002/0178273 A1 | 11/2002 | Pardo-Castellote et al. |
| 2003/0096629 A1* | 5/2003 | Elliott et al. ............ 455/522 |
| 2004/0001084 A1 | 1/2004 | Shrinidhi et al. |
| 2004/0090943 A1 | 5/2004 | Costa et al. |
| 2004/0228490 A1 | 11/2004 | Klemba et al. |
| 2004/0259554 A1 | 12/2004 | Rappaport et al. |
| 2004/0259555 A1 | 12/2004 | Rappaport et al. |
| 2005/0036570 A1* | 2/2005 | Kwak et al. ............ 375/316 |
| 2005/0050004 A1 | 3/2005 | Sheu et al. |
| 2005/0074019 A1 | 4/2005 | Handforth et al. |
| 2005/0124346 A1 | 6/2005 | Corbett et al. |
| 2005/0147119 A1 | 7/2005 | Tofano |
| 2005/0149940 A1 | 7/2005 | Calinescu et al. |
| 2005/0192037 A1 | 9/2005 | Nanda et al. |
| 2005/0192727 A1 | 9/2005 | Shostak et al. |
| 2005/0201349 A1 | 9/2005 | Budampati |
| 2005/0213612 A1 | 9/2005 | Pister et al. |
| 2005/0223110 A1 | 10/2005 | Honary et al. |
| 2005/0238058 A1 | 10/2005 | Peirce, Jr. et al. |
| 2006/0002368 A1 | 1/2006 | Budampati et al. |
| 2006/0028997 A1 | 2/2006 | McFarland |
| 2006/0029060 A1 | 2/2006 | Pister |
| 2006/0029061 A1 | 2/2006 | Pister et al. |
| 2006/0039298 A1 | 2/2006 | Zuniga et al. |
| 2006/0064477 A1 | 3/2006 | Renkis |
| 2006/0095539 A1 | 5/2006 | Renkis |
| 2006/0111040 A1 | 5/2006 | Jenkins et al. |
| 2006/0159024 A1 | 7/2006 | Hester |
| 2006/0193262 A1 | 8/2006 | McSheffrey et al. |
| 2006/0215582 A1 | 9/2006 | Castagnoli et al. |
| 2006/0215627 A1 | 9/2006 | Waxman |
| 2006/0219861 A1 | 10/2006 | Wood |
| 2006/0221949 A1 | 10/2006 | Anjum |
| 2006/0227729 A1 | 10/2006 | Budampati et al. |
| 2006/0256722 A1 | 11/2006 | Taha et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolvaennu |
| 2007/0030832 A1 | 2/2007 | Gonia et al. |
| 2007/0053295 A1 | 3/2007 | Cleveland et al. |
| 2007/0071006 A1 | 3/2007 | Bosch et al. |
| 2007/0147255 A1 | 6/2007 | Oyman |
| 2007/0153817 A1 | 7/2007 | Osann |
| 2007/0160020 A1 | 7/2007 | Osann |
| 2007/0161371 A1 | 7/2007 | Dobrowski et al. |
| 2007/0183439 A1 | 8/2007 | Ossan, Jr. |
| 2007/0184852 A1 | 8/2007 | Johnson et al. |
| 2007/0206503 A1 | 9/2007 | Gong et al. |
| 2007/0206547 A1 | 9/2007 | Gong et al. |
| 2007/0206616 A1 | 9/2007 | Orth |
| 2007/0223310 A1 | 9/2007 | Tran |
| 2007/0230403 A1 | 10/2007 | Douglas et al. |
| 2007/0248047 A1 | 10/2007 | Shorty et al. |
| 2007/0250713 A1 | 10/2007 | Rahman et al. |
| 2007/0257791 A1 | 11/2007 | Arita et al. |
| 2007/0297366 A1 | 12/2007 | Osann |
| 2007/0298805 A1 | 12/2007 | Basak et al. |
| 2008/0016344 A1 | 1/2008 | Holden et al. |
| 2008/0080364 A1 | 4/2008 | Barak et al. |
| 2008/0095221 A1 | 4/2008 | Picard |
| 2008/0125177 A1 | 5/2008 | Gupta |
| 2008/0141769 A1 | 6/2008 | Schmidt et al. |
| 2008/0189394 A1 | 8/2008 | Ross et al. |
| 2008/0273486 A1 | 11/2008 | Pratt, Jr. et al. |
| 2008/0274766 A1 | 11/2008 | Pratt, Jr. et al. |
| 2008/0278145 A1 | 11/2008 | Wenger |
| 2008/0279155 A1 | 11/2008 | Pratt, Jr. et al. |
| 2008/0279204 A1 | 11/2008 | Pratt, Jr. et al. |
| 2008/0298275 A1 | 12/2008 | De Sousa |
| 2009/0010203 A1 | 1/2009 | Pratt, Jr. et al. |
| 2009/0010204 A1 | 1/2009 | Pratt, Jr. et al. |
| 2009/0010205 A1 | 1/2009 | Pratt, Jr. et al. |
| 2009/0010233 A1 | 1/2009 | Pratt, Jr. et al. |
| 2009/0191894 A1 | 7/2009 | Poegel et al. |
| 2009/0211368 A1 | 8/2009 | Garnett et al. |
| 2009/0222541 A1 | 9/2009 | Monga et al. |
| 2009/0235354 A1 | 9/2009 | Gray et al. |
| 2010/0128906 A1 | 5/2010 | Haenggi et al. |
| 2010/0226255 A1* | 9/2010 | DiStasio et al. ............ 370/241 |

OTHER PUBLICATIONS

Kannan Srinivasan and Philip Levis, "RSSI is Under Appreciated," Proceedings of the Third ACM Workshop on Embedded Network Sensors (EmNets 2006), May 2006.

IEEE Std 802.15.4-2006, IEEE Standard for-Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs).

\* cited by examiner

WIRELESS SENSOR NETWORK ACCESS POINT AND DEVICE RF SPECTRUM ANALYSIS SYSTEM AND METHOD

BACKGROUND

The present invention relates generally to wireless networks and, more particularly, to measuring and analyzing radio frequency (RF) interference proximate and within a wireless field device mesh network.

Mesh networking is a flexible network architecture that is becoming prevalent in industrial applications. A mesh network includes a cloud of nodes and a gateway computer (gateway) that connects a high-speed bus to the mesh network. Mesh networks avoid many of the limitations of other network topologies by allowing neighboring nodes within the same network to communicate directly with each other, avoiding unnecessary routing of communications to the gateway. A software program known as a network manager, typically running on the gateway, assigns each node multiple communications pathways that are interchanged to compensate for bottlenecks and linkage failures. By allowing neighboring nodes to form communications relays directly to the target node, and by routing around failures or bottlenecks, network response time is improved while minimizing network power usage by minimizing the number of transmissions required to relay communications. Using multiple communication pathways provides path diversity which improves network reliability.

A wireless mesh network is a communication network made up of a plurality of wireless devices (i.e., nodes) organized in a mesh topology. In a true wireless mesh network, which may also be referred to as a self-organizing multi-hop network, each device must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed in a mesh network, in contrast with point-to-point systems which employ remote devices communicating directly to a centralized base station.

The use of lower power radios is essential for wireless network systems designed for sensor/actuator-based applications, such as a wireless field device mesh network. Many devices in the network must be locally-powered because power utilities, such as 120 VAC utilities or powered data buses, are not located nearby or are not allowed into hazardous locations where instrumentation, sensors, and actuators must be located without incurring great installation expense. "Locally-powered" means powered by a local power source, such as a portable electrochemical source (e.g., long-life batteries or fuel cells) or by a low-power energy-harvesting power source (e.g., vibration, solar cell, or thermo-electric generator). A common characteristic of local power sources is their limited power capacity, either stored, as in the case of a long-life battery, or produced, as in the case of a thermo-electric generator. Often, the economic need for low installation cost drives the need for battery-powered devices communicating as part of a wireless sensor network. Effective utilization of a limited power source, such as a primary cell battery which cannot be recharged, is vital for a well functioning wireless sensor device. Batteries are expected to last more than five years and preferably last as long as the life of the product.

In order to save power, some wireless field device network protocols limit the amount of traffic any node or device can handle during any period of time by only turning their transceivers ON for limited amounts of time to listen for messages. Thus, to reduce average power, the protocol may allow duty-cycling of the transceivers between ON and OFF states. Some wireless field device network protocols may use a global duty cycle to save power such that the entire network is ON and OFF at the same time. Other protocols, such as Time Division Multiple Access (TDMA) based protocols, may use a local duty cycle where only the communicating pair of nodes that are linked together are scheduled to turn ON and OFF in a synchronized fashion at predetermined times. Typically, the network manager assigns a link to a pair of nodes, as well as a specific time slot for communications, an RF channel to be used by the transceivers, who is to be receiving, and who is to be transmitting, if need be, at that moment in time (e.g., a TDMA with a RF channel hopping protocol, such as WirelessHART®). The network manager synchronizes the duty cycle and assigns multiple communication pathways, coordinating communication between nodes, generating control messages, communications schedules and data queries to suit the situation.

The self-organizing capability of mesh networks to form alternate paths for communicating between devices and between devices and a gateway provides redundant paths for wireless messages. This enhances communication reliability by ensuring that there is at least one alternate path for messages to travel even if another path gets blocked or degrades due to environmental influences or due to RF interference. Nevertheless, even with the robust communication reliability inherent in a mesh network, RF interference from unknown sources can degrade the performance of the network. Using alternate paths to circumvent interference typically results in more hops due to reduced range and energy-wasting re-transmissions to get a message to or from the gateway. If the RF interference is severe enough, all transmissions to and from a node may be blocked for as long as the RF interference persists.

RF interference sources are often intermittent and transient in nature making their detection and identification difficult and time consuming. Detecting and locating sources of RF interference in real time would allow rapid identification and mitigation of the sources, further improving network reliability. Systems have been proposed to monitor interference in wireless communication networks, such as cell phone networks, however such systems are generally unsuitable for wireless field device mesh networks due to the relatively high power requirements of such systems. RF site surveys are expensive since they require specialized RF equipment and specially trained personnel. Even then, the information provided is only a snapshot in time of the true RF environment and may miss important transitory RF interference events. Finally, the data from a site survey quickly becomes stale due to ongoing changes in the surrounding physical plant and in plant infrastructure, as well as changes occurring "outside the plant fence".

SUMMARY

The present invention includes a system for measuring and analyzing radio frequency (RF) interference proximate and within a wireless field device mesh network. A centralized software module (CSWM) collects and analyzes values from one or more wireless devices of the wireless field device mesh network representing RF power measurements as received on an assigned RF channel and values representing corresponding times of the RF power measurements. Each wireless device of the wireless field device mesh network measures RF power as received on the assigned RF channel and a corresponding time of measurement, storing the measurement if it was made at a time other than during reception of a signal resulting in the subsequent transmission by the wireless device of either an acknowledgment signal or a non-acknowledgement signal. The stored RF power measurements in each wireless device and the stored corresponding times of measurement are used to determine values representing the RF power measurements and values representing the corresponding times of the RF power measurements and then discarded. These representative values are stored within the wireless device until receipt by the wireless device of a signal acknowledging successful reporting of the representative values. A network manager coordinates communication between the wireless devices and coordinates and synchronizes the corresponding times of RF power measurement throughout the wireless field device mesh network.

DETAILED DESCRIPTION

Figure 1:
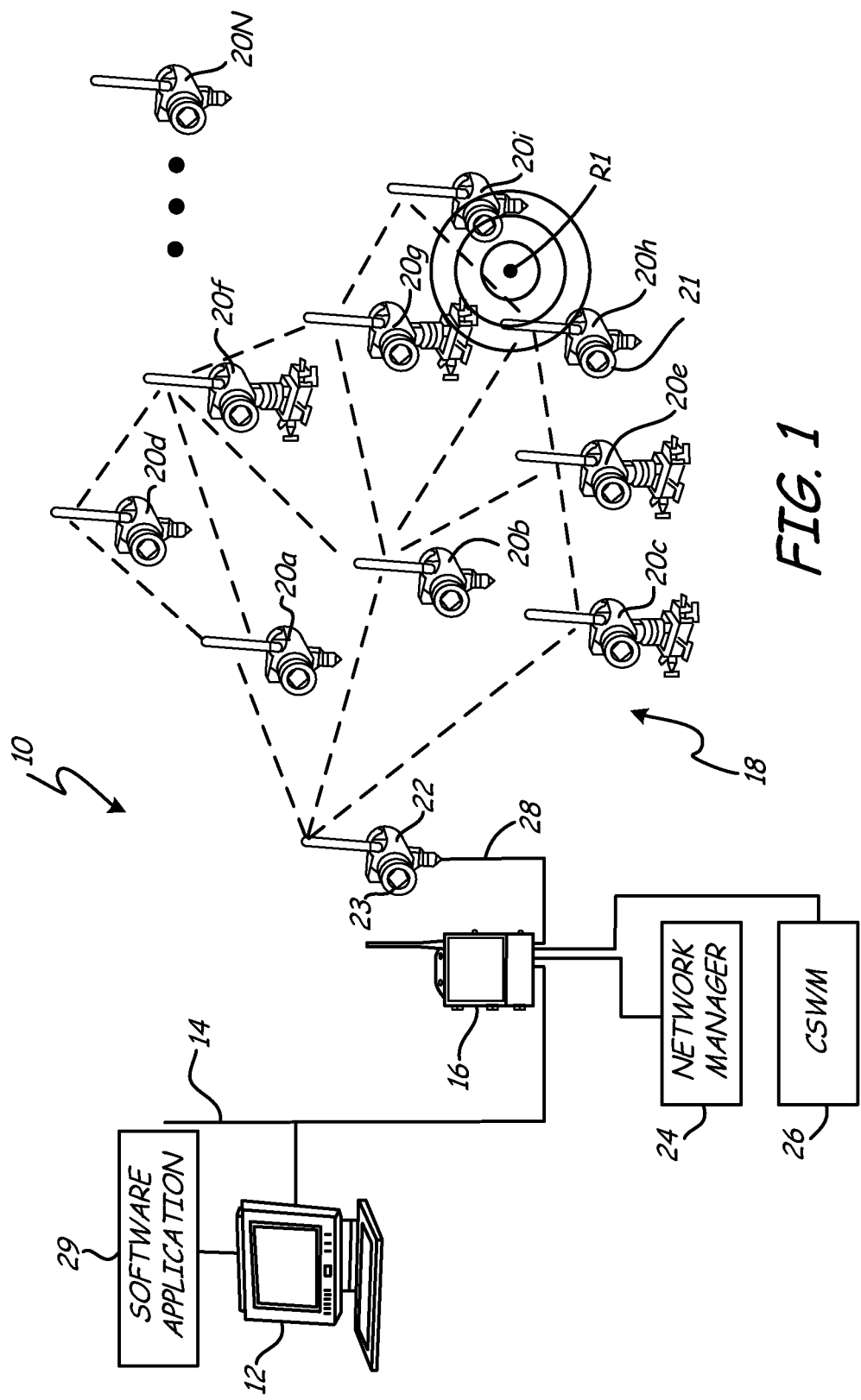
FIG. 1 is a diagram illustrating an implementation of the present invention for measuring and analyzing RF interference proximate and within a wireless field device mesh network.

The present invention will be discussed in terms of measuring and analyzing radio frequency (RF) interference proximate and within a wireless field device network with a mesh network topology. A person skilled in the art will recognize that the invention is equally suited to other network topologies and is not limited to solely the embodiments described, but that the invention will include all embodiments falling within the scope of the appended claims.

The present invention uses the received RF power measurement capability available in wireless devices, such as, for example, those with radios that comply with the IEEE 802.15.4 standard, to detect sources of RF interference. The IEEE 802.15.4 standard defines a physical layer (PHY) and a media access control (MAC) layer for low-data-rate wireless connectivity with fixed, portable, and nomadic devices with very limited power consumption requirements. The very limited power consumption requirements are, for example, much less than those for a cell phone. IEEE 802.15.4, 2.4 GHz compatible radios transmit and receive on any of 16 RF channels inside the 2.4 GHz Industrial, Scientific, and Medical (ISM) radio band and can measure received RF power on any of the channels. The received RF power measurement function is referred to as Energy Detection (ED) in the standard, but more commonly referred to as Received Signal Strength Indicator (RSSI) measurement. The IEEE 802.15.4 standard describes two applications for the RSSI measurement. The first is as part of a Clear Channel Assessment (CCA) function to avoid unnecessary RF interference by members of the same wireless network. As part of some modes of the CCA function, a sending device measures RSSI on the RF channel just before a transmission is to begin to ensure that the assigned transmission channel is clear of other intra-network transmissions. If the RSSI measurement on the RF channel is above a threshold, indicating a nearby device in the network is already transmitting on the channel, the potentially interfering device delays transmission for a random time interval to avoid causing interference to the already occupied channel. The CCA function is not typically used with a Time Division Multiple Access (TDMA) with a channel hopping protocol, such as WirelessHART® because all communications are typically synchronized and coordinated by the network manager such that no nearby devices can be transmitting on the same RF channel at the same time.

In the second application, some network management algorithms use the strength of received signals to determine the best particular RF channel to employ on links between devices. Should the RSSI readings start to decrease, the network manager could select a different RF channel for operation between the devices to ensure continued link reliability. Alternatively, the RSSI readings for all RF channels on a link are combined and averaged to determine the strongest links to use for message routing through the network. Only received signal strengths of successful transmissions or unsuccessful transmissions due to a pre-defined error condition are stored by the wireless devices and reported to the network manager since they represent RF channel conditions present during intra-network traffic, even if it includes interference energy from other RF sources.

Successful transmissions are acknowledged by a return transmission, called an acknowledgement signal or ACK, from the receiving node to the transmitting node. Upon receipt of the ACK response, the transmitting node erases the originally transmitted message and the receiving node then becomes responsible for forwarding the message to the next hop in the mesh network. Unsuccessful transmissions due to certain pre-defined error conditions result in a non-acknowledgement signal or NACK being sent from the receiving node to the transmitting node. Upon receipt of the NACK response, the transmitting node will retransmit the message on a different RF channel or to a different node in its next scheduled timeslot, but will not erase the originally transmitted message until it receives an ACK response from the destination node.

The pre-defined error conditions that result in a NACK response vary among wireless protocols. In some protocols, conditions that result in a NACK response include, for example, a full message buffer in the receiving node, a frame checksum error, and a message integrity code error. Unsuccessful transmissions not resulting in an ACK or a NACK response also vary among wireless protocols and can be due to, for example, a frame checksum error, a message integrity code error, the wrong network ID, or a signal too weak or distorted for the receiving node to detect that a message is even sent. Some error conditions, for example, a frame checksum error, result in a NACK response in some wireless protocols and no NACK response in others, depending on the pre-defined error conditions for a particular wireless protocol. In all cases, unsuccessful transmissions that do not meet a protocol's pre-defined error conditions are ignored: no ACK or NACK response is sent, and the RSSI measurement associated with that time is erased.

The present invention employs wireless devices to measure RF interference proximate and within a wireless field device mesh network by recording and analyzing RSSI measurements on each RF channel used over a period of time, the RSSI measurements being taken and recorded during times other than during the reception of a signal resulting in the subsequent transmission by the wireless devices of either an ACK or a NACK response. It is during these so called intra-network quiet times that background or external RF interference is most easily and accurately detected. Three of the possible intra-network quiet times are during an open listen, an open channel slot, and a quiet sub-slot, as will be described below.

A mesh network using a TDMA data link layer with a channel hopping protocol, such as WirelessHART®, with its robust design, is particularly well suited to measuring, collecting, reporting and analyzing RSSI measurements from disparate nodes. Time slots are allocated by the network manager for link level communication and synchronized throughout the entire network to within one millisecond, enabling precise control of RSSI measurement times and subsequent correlation of RSSI measurement data. The network manager also coordinates RF channel assignments by either directly or indirectly assigning a channel for each allocated link in a time slot. The devices are pre-programmed to change RF channels based on absolute timeslot number which is incremented through the entire mesh network as part of the time synchronization mechanism controlled by the network manager so typically no two links utilize the same RF channel within any timeslot. This channel hopping is pseudo-random, meaning that devices change channels in a random-like sequence, eventually using all RF channels equally.

RSSI measurements, and times corresponding to the measurements taken by wireless devices of the present invention during intra-network quiet times, are stored within the wireless device taking the measurements until they are used to determine values representing received RF power measurements and values representing corresponding times of measurement. Determining the values representing the received RF power measurements includes, for example, determining statistical values, performing unit conversions, or making no change at all to the original RSSI measurements. The statistical values for each RF channel include, for example, average RF power measured, standard deviation of RF power measured, variance of RF power measured, start time of period, end time of period, maximum RF power measured, time when maximum RF power was measured, minimum RF power measured, and time when minimum RF power was measured and duty cycle. The values representing the RF power measurements are determined on a channel by channel basis, eventually covering the ISM band, representing the RF energy around a particular device. These values representing the RF power measurements normally represent background RSSI measurement levels for each channel. Values representing the received RF power measurements exceeding the background RSSI measurement levels indicate sources of RF interference. Values representing received RF power measurements and times corresponding to the measurements are transmitted in a report, either periodically or on demand, over the mesh network to a centralized software module (CSWM), typically running on the gateway. The transmission of the report from each device is scheduled in a staggered fashion so there is no significant impact on the normal operation of the network. The CSWM combines the reports of values representing RF power measurements and correlates the times corresponding to the measurements from multiple devices by RF channel. Along with the known location of at least three of the devices, the CSWM determines the time periods of interference, characterizes the source or sources of interference (e.g. Wi-Fi channel 1), locates the source or sources of RF interference and generates alerts if the interference exceeds a user defined threshold. The CSMW preferably communicates any interference information and alerts to a separate software application running on a host computer or to a display for use by a system operator.

In situations where interference is severe enough to temporarily disable the ability of a wireless device to communicate with the rest of the wireless field device mesh network, nearby wireless devices will still be able to detect the interference and return the report of values representing received RF power measurements and times corresponding to the measurements to the CSWM through the still-functioning links in the wireless field device mesh network. By correlating the values representing RF power measurements and times corresponding to the measurements from the nearby wireless devices and combining the known location of at least three of the devices, the present invention is able to determine the location of the source of the disabling RF interference by using standard triangulation algorithms even when the interference is severe enough to temporarily disable a wireless device.

The present invention minimizes the energy necessary to provide essentially continuous detection and reporting of RF interference throughout the network when reporting only statistical information, rather than each recorded measurement, and by transmitting the reports only on a periodic basis, for example, every 15 minutes. Because detection is essentially continuous, intermittent and transient RF interference sources are located and identified. As noted above, minimizing energy usage is essential in wireless field device networks. Measurements during the intra-network quiet times described below vary in how frequently measurements are recorded and transmitted to the CSWM, with a corresponding variation in energy usage. By moving between open listen, open channel slot, and quiet sub-slot measurements, a need for more aggressive interference detection and location can be balanced against the energy usage required.

FIG. 1 is a diagram illustrating an implementation of the present invention for measuring and analyzing RF interference proximate and within a wireless field device mesh network. FIG. 1 shows control and process monitoring system 10 which includes host computer 12, high-speed network 14, gateway 16, and wireless field device mesh network 18. Wireless field device mesh network 18 includes wireless devices or nodes 20a-20i . . . 20N and access point 22. Gateway 16 includes network manager 24 and CSWM 26 although alternately either or both may reside on host computer 12. Host computer 12 includes software application 29. Software application 29 is, for example, control software or monitoring software. Gateway 16 connects mesh network 18 with host computer 12 over high-speed network 14. Access point 22 is the interface between gateway 16 and wireless devices 20a-20i . . . 20N. Dedicated link 28 connects access point 22 to gateway 16. Alternatively, access point 22 may be integrated with gateway 16, eliminating the need for dedicated link 28. Access point 22 and wireless devices 20a-20i . . . 20N employ radios with received RF power measurement capability, such as, for example, radios that comply with the IEEE 802.15.4 standard. Access point 22 and wireless devices 20a-20i . . . 20N also employ circuitry to store values and perform basic statistical calculations, such circuitry being well known in the art. Access point 22 and wireless devices 20a-20i . . . 20N communicate with each other as a wireless mesh network using a TDMA with a channel hopping protocol, such as WirelessHART®. Optionally, access point 22 or at least one of wireless devices 20a-20i . . . 20N each further comprise local operator interface (LOI) 23, 21, respectively. LOI 23, 21 include a display and a limited input function, typically a small number of buttons. Also shown in FIG. 1 is RF interference source R1.

Messages are communicated from host computer 12 to gateway 16 over high-speed network 14. A message destined for one of wireless devices 20a-20i . . . 20N of wireless field device mesh network 18 is sent from gateway 16 to access point 22 of wireless field device mesh network 18 over dedicated link 28. Access point 22 then transmits the message either directly or in a hop-by-hop fashion to the one of wireless devices 20a-20i . . . 20N of wireless field device mesh network 18 over one of several different paths. Similarly, a message from one of wireless devices 20a-20i . . . 20N of wireless field device mesh network 18 is routed back through wireless field device mesh network 18 from node to node over one of several paths until it arrives at access point 22. Access point 22 then sends the message to gateway 16 over dedicated link 28. Messages destined for host computer 12 are communicated from gateway 16 to host computer 12 over high-speed network 14. Time slot, link assignments, and RF channel assignments between nodes necessary to coordinate communications throughout wireless field device mesh network 18 are allocated by network manager 24. Time slot and RF channel allocations and link assignments for wireless field device mesh network 18 are sent from gateway 16 to access point 22 via dedicated link 28. Access point 22 transmits the time slot assignments, RF channel assignments, and link assignments either directly or in a hop-by-hop fashion to wireless devices 20a-20i . . . 20N.

One embodiment of the present invention for detecting RF interference when the RSSI measurements are taken and recorded during an intra-network quiet time, is during an "open listen." An open listen includes those times when a signal is expected by the receiving node, but not sent by the transmitting node. This can happen because the transmitting node may simply not have any message to transmit when its assigned time slot arrives. In a TDMA with a channel hopping protocol, such as WirelessHART®, the network manager will schedule multiple times, or time slots, during which a pair of nodes are assigned to link to transfer a message. This enhances network reliability to insure that the message gets through. If the first link assignment does not work, a second or third should. Often, however, the message gets through on the first try, is acknowledged and then erased by the sending node. This may leave open listen links where the receiving node will listen and take an RSSI measurement while listening, but the transmitting node will have nothing to send. Typically, since no other device in the wireless field device mesh network is scheduled to transmit in that timeslot on that particular RF channel, RSSI measurements will indicate background levels of RF noise or the presence of RF interference and not intra-network traffic. The transmitting node, having nothing to send in the timeslot, can also activate its radio and take an RSSI measurement on the assigned RF channel. Thus, the two devices associated with a link can use their link level knowledge to take coordinated RSSI measurements taken on the same RF channel at the same time from two different locations.

An open listen also includes those times when a signal is expected by the receiving node and sent by the transmitting node, but neither an ACK nor a NACK response is sent back for reasons described above. From the perspective of the receiving node, this appears to be an intra-network quiet time because no recognizable intra-network transmission is detected. RSSI measurements made under these conditions may not indicate purely background levels of RF noise, because the transmitting node did transmit something on the assigned RF channel, but such RSSI measurements provide important information on a source of RF interference that may have caused the transmission to fail.

Figure 2:
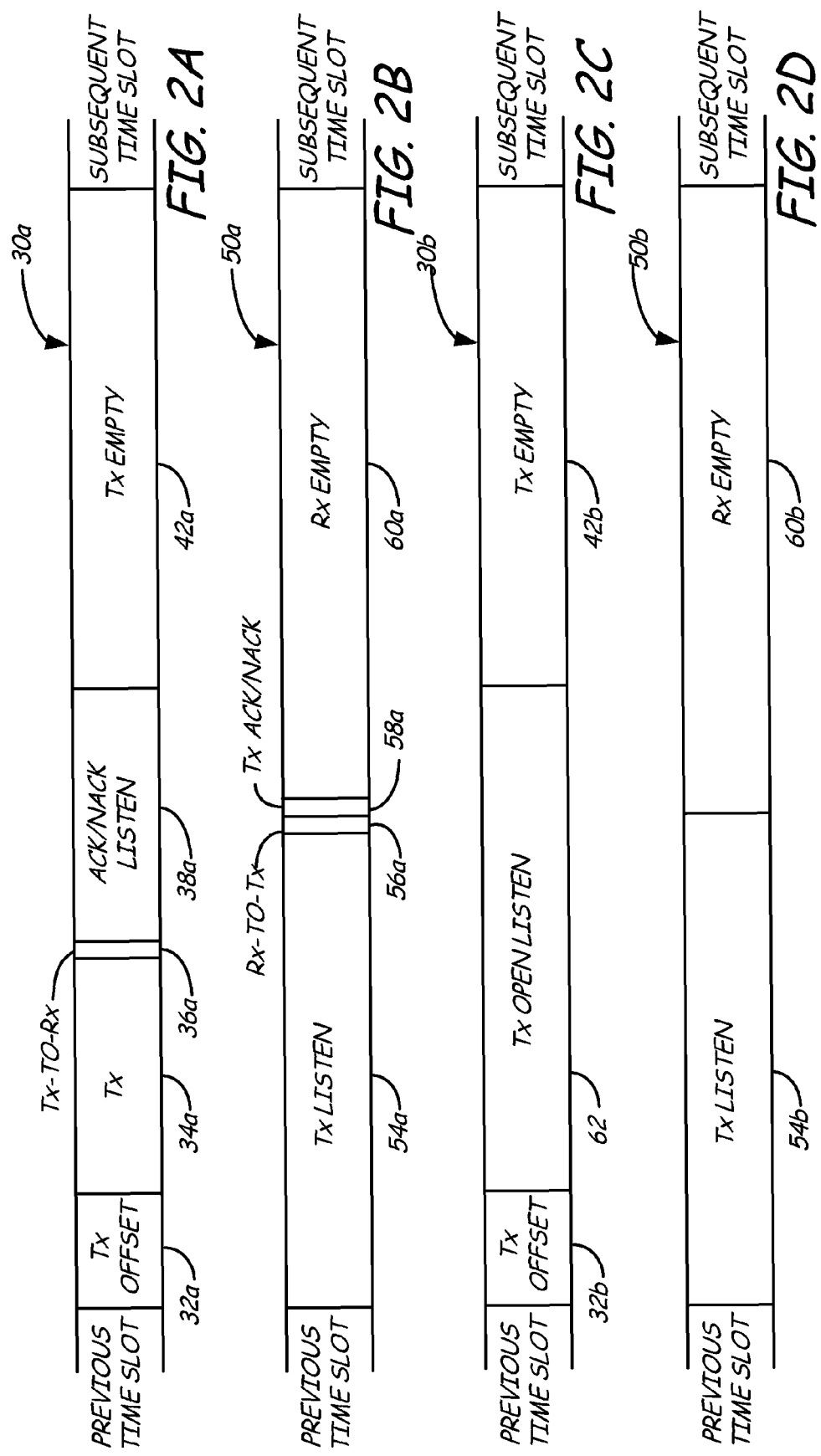
FIGS. 2A-2D illustrate the complementary arrangement of sub-slots within a time slot for transmitter nodes and receiver nodes.

FIGS. 2A and 2B illustrate the complementary arrangement of sub-slots within a time slot for a transmitter node and a receiver node, respectively, during the reception of a signal resulting in transmission by the receiving wireless device of either an ACK or a NACK response. "Tx" means transmit and "Rx" means receive in reference to FIGS. 2A-2D and 3A-3B. Each allocated time slot has a designated transmitter node and a designated receiver node. Time slots are composed of an arrangement of sub-slots of varying lengths and types that govern the timing of actions taken by a transmitter and a receiver within the time slot. The arrangement is complimentary between linked nodes and repeats continuously. As shown in FIG. 2A, transmitter time slot 30a begins with Tx Offset sub-slot 32a, followed by Tx sub-slot 34a. Tx sub-slot 34a is followed by Tx-to-Rx sub-slot 36a which is followed in turn by ACK/NACK Listen sub-slot 38a, and Tx Empty sub-slot 42a. FIG. 2B shows that receiver time slot 50a begins with Tx Listen sub-slot Ma followed by Rx-to-Tx sub-slot 56a, Tx ACK/NACK sub-slot 58a, and Rx Empty sub-slot 60a. Transmitter timeslot 30a and receiver timeslot 50a are actually the same network timeslot, as viewed from the transmitter node and receiver node respectively.

At the start of receiver time slot 50a, the receiver node turns its radio on and listens for any transmission from the transmitter node during Tx Listen sub-slot Ma. During this time, at the start of transmitter time slot 30a, the transmitter node is silent, delaying any transmission by Tx Offset sub-slot 32a. The length of Tx Offset sub-slot 32a is at least the maximum error in network time synchronization. This ensures that the transmitter node does not begin transmitting until the receiver node is ready to listen. Following Tx Offset sub-slot 32a, the transmitter node radio is turned on and transmits during Tx sub-slot 34a. The length of Tx sub-slot 34a is sufficient to accommodate a data packet, including all header and trailer bytes that accompany the data. The length of Tx Listen sub-slot Ma is determined by the length of Tx sub-slot 34a plus at least twice the error in network time synchronization. This ensures that regardless of the direction of the maximum network time coordination error, all of Tx sub-slot 34a will fall within Tx Listen sub-slot Ma. During Tx Listen sub-slot Ma, the receiver performs an RSSI measurement using the ED function described above and stores the measurement, as well as the time of measurement and RF channel. Following Tx sub-slot 34a, the transmitter node switches its radio from transmit to receive during Tx-to-Rx sub-slot 36a and then begins listening for an ACK or a NACK response from the receiving node during ACK/NACK Listen sub-slot 38a. If the receiving node successfully receives the data packet, during Tx Listen sub-slot Ma, it switches its radio from receive to transmit during Rx-to-Tx sub-slot 56a and then sends an ACK response to the transmitter node during Tx ACK/NACK sub-slot 58a. Alternatively, if the receiving node unsuccessfully receives the data packet due to a pre-defined error condition during Tx Listen sub-slot Ma, it switches its radio from receive to transmit during Rx-to-Tx sub-slot 56a and then sends a NACK response to the transmitter node during Tx ACK/NACK sub-slot 58a. In either case, following Tx ACK/NACK sub-slot 58a, the receiver node retains the stored RSSI information for use in network management algorithms to determine the best particular RF channel to employ on links between devices, shuts off its radio, and waits during Rx Empty sub-slot 60a for the start of the next time slot. ACK/NACK Listen sub-slot 38a is long enough to accommodate at least the length of Rx-to-Tx sub-slot 56a and Tx ACK/NACK sub-slot 58*a*. This ensures that all of Tx ACK/NACK sub-slot 58*a* falls within ACK/NACK Listen sub-slot 38*a*. Following ACK/NACK Listen sub-slot 38*a*, the transmitter node shuts of its radio and waits during Tx Empty sub-slot 42*a* for the start of the next time slot.

FIGS. 2C-2D illustrate the complementary arrangement of sub-slots within a time slot for a transmitter node and a receiver node, respectively, of the open listen embodiment when the transmitter has nothing to send. Because the transmitter, as originating wireless device, has nothing to transmit, this does not result in the subsequent transmission by the receiver, as destination wireless device, of either an ACK or a NACK response. FIG. 2C illustrates transmitter time slot 30*b* begins with Tx Offset sub-slot 32*b*, followed by Tx Open Listen 62, which is followed by Tx Empty sub-slot 42*b*. FIG. 2D shows that receiver time slot 50*b* begins with Tx Listen sub-slot Ma, followed by Rx Empty sub-slot 60*b*. Transmitter timeslot 30*b* and receiver timeslot 50*b* are actually the same network timeslot, as viewed from the transmitter node and receiver node respectively.

At the start of receiver time slot 50*b*, the receiver node turns its radio on and listens for any transmission from the transmitter node during Tx Listen sub-slot 54*b*, as described for FIG. 2B. At this point, the receiver node does not know that the transmitter has nothing to send and performs an RSSI measurement using the ED function described above, storing the measurement, as well as the time of measurement and RF channel. The receiving node, not having successfully received the data packet during Tx Listen sub-slot 54*b*, does not switch its radio from receive to transmit. Instead, it switches the radio off, retains the stored RSSI information for use in detecting RF interference, and waits during Rx Empty sub-slot 60*b* for the start of the next time slot. During this time, at the start of transmitter time slot 30*b*, the transmitter node delays any activity by Tx Offset sub-slot 32*b*. The length of Tx Offset sub-slot 32*b* is at least the maximum error in network time synchronization. Following Tx Offset sub-slot 32*b*, during Tx Open Listen 62, the transmitter node, having nothing to transmit, switches on its radio and performs an RSSI measurement using the ED function described above, storing the measurement, as well as the time of measurement and RF channel. Following Tx Open Listen 62, the transmitter node retains the stored RSSI information for use in detecting RF interference, shuts of its radio, and waits during Tx Empty sub-slot 42*b*, for the start of the next time slot.

FIGS. 2A and 2D illustrate the complementary arrangement of sub-slots within a time slot for a transmitter node and a receiver node, respectively, of the open listen embodiment when a signal is expected by the receiving node and sent by the transmitting node, but neither an ACK nor a NACK response is sent because the transmission is unsuccessful and the failure does not meet the pre-defined error conditions of the protocol employed. From the perspective of the receiving node, this appears to be an intra-network quiet time because no recognizable intra-network transmission is detected. At the start of receiver time slot 50*b*, the receiver node turns its radio on and listens for any transmission from the transmitter node during Tx Listen sub-slot 54*b*, as described for FIG. 2B, performing an RSSI measurement using the ED function described above, and storing the measurement, as well as the time of measurement and RF channel. The receiving node, not having successfully received the data packet during Tx Listen sub-slot 54*b*, does not switch its radio from receive to transmit. Instead, it switches the radio off, retains the stored RSSI information for use in detecting RF interference, and waits during Rx Empty sub-slot 60*b* for the start of the next time slot. Meanwhile, the transmitter node operates as described above for FIG. 2A. Transmitter timeslot 30*a* and receiver timeslot 50*b* are actually the same network timeslot, as viewed from the transmitter node and receiver node respectively.

Figure 3:
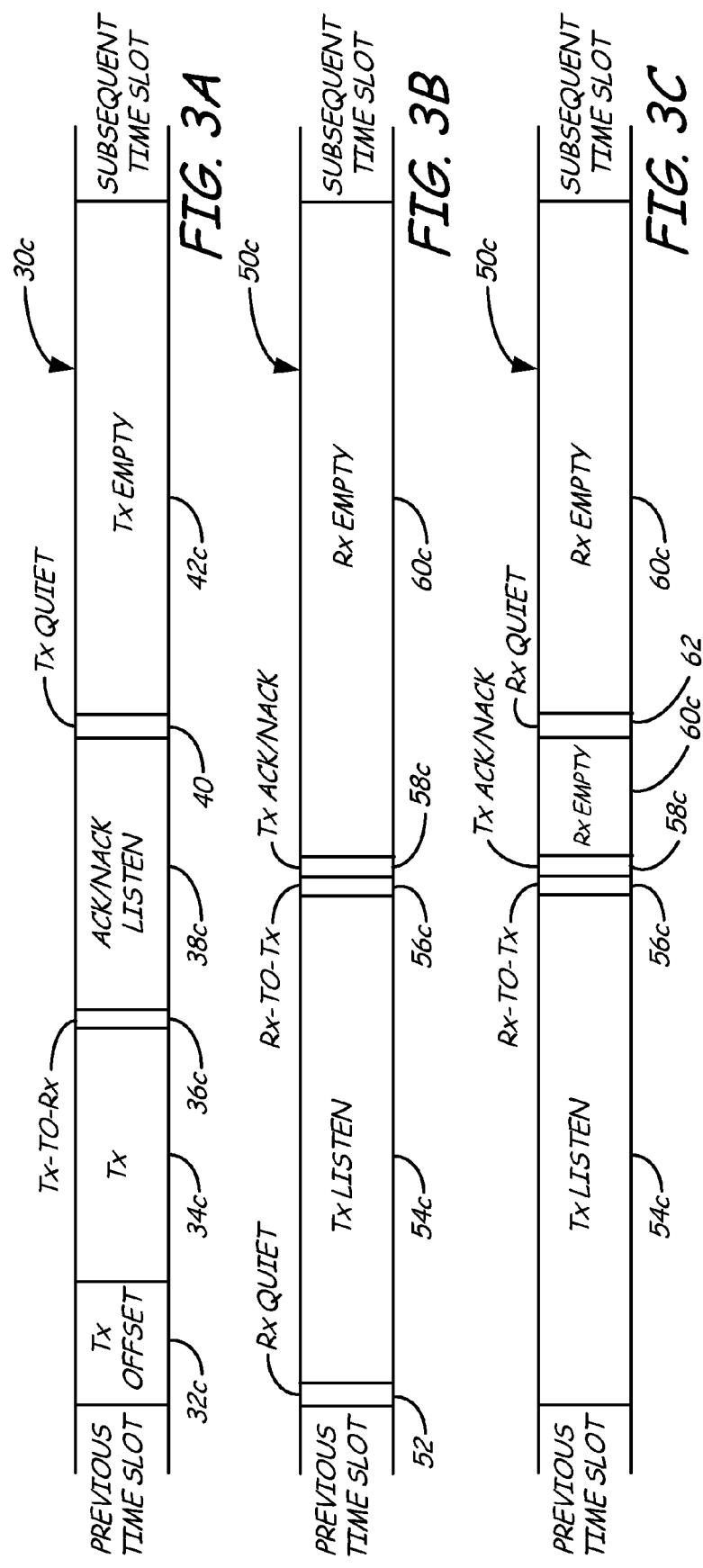
FIGS. 3A-3C illustrate the complementary arrangement of "quiet sub-slots" within a time slot for a transmitter node and a receiver node.

In another embodiment of the present invention for detecting RF interference when the RSSI measurements are recorded during an intra-network quiet time, each of wireless devices 20*a*-20*i* . . . 20N and access point 22 of wireless field device mesh network 18 scheduled to send or receive a transmission during an allocated time slot on an allocated RF channel measures RSSI on the allocated channel during a portion of the time slot, or "sub-slot", when the network is totally silent. FIGS. 3A and 3B illustrate the complementary arrangement of "quiet sub-slots" within a time slot for a transmitter node and a receiver node, respectively, of this embodiment. Each allocated time slot has a designated transmitter node and a designated receiver node. Time slots are composed of an arrangement of sub-slots of varying lengths and types that govern the timing of actions taken by a transmitter and a receiver within the time slot. The arrangement is complimentary between linked nodes and repeats continuously. As shown in FIG. 3A, transmitter time slot 30*c* begins with Tx Offset sub-slot 32*c*, followed by Tx sub-slot 34*c*. Tx sub-slot 34*c* is followed by Tx-to-Rx sub-slot 36*c* which is followed in turn by ACK/NACK Listen sub-slot 38*c*, Tx Quiet sub-slot 40, and Tx Empty sub-slot 42*c*. FIG. 3B shows that receiver time slot 50*c* begins with Rx Quiet sub-slot 52 followed by Tx Listen sub-slot 54*c*. Tx Listen sub-slot 54*c* is followed by Rx-to-Tx sub-slot 56*c*, Tx ACK/NACK sub-slot 58*c*, and Rx Empty sub-slot 60*c*. Transmitter timeslot 30*c* and receiver timeslot 50*c* are actually the same network timeslot, as viewed from the transmitter node and receiver node respectively.

At the start of receiver time slot 50*c*, during Rx Quiet sub-slot 52, the receiver node performs an RSSI measurement using the ED function described above and stores the measurement, as well as the time of measurement and RF channel. During this time, the transmitter node is silent, delaying any transmission by Tx Offset sub-slot 32*c*. The length of Tx Offset sub-slot 32*c* is at least the sum of the maximum error in network time synchronization plus the time for the receiver node to take its RSSI measurement, Rx Quiet sub-slot 52*c*. Tx Offset sub-slot 32*c* delays transmission long enough to ensure the transmitter node will not transmit at the same time as the RSSI measurement of Rx Quiet sub-slot 52. Importantly, because the same Tx Offset sub-slot 32*c* is present in all allocated time slots for all wireless devices in the network, the network is totally silent on all RF channels during the RSSI measurement of Rx Quiet sub-slot 52. RSSI measurements will indicate background levels of RF noise or the presence of RF interference. Because the network is totally silent, this is not a time when the receiver node receives a signal resulting in the subsequent transmission by the wireless device of either an ACK or a NACK response.

Following Rx Quiet sub-slot 52, the receiver node listens for any transmission from the transmitter node during Tx Listen sub-slot 54*c*. Meanwhile, following Tx Offset sub-slot 32*c*, the transmitter node transmits during Tx sub-slot 34*c*. The length of Tx sub-slot 34*c* is sufficient to accommodate a data packet including all header and trailer bytes that accompany the data. The length of Tx Listen sub-slot 54*c* is determined by the length of Tx sub-slot 34*c* plus at least twice the error in network time synchronization. This ensures that regardless of the direction of the maximum network time synchronization error, all of Tx sub-slot 34*c* will fall within Tx Listen sub-slot 54*c*. It is during Tx Listen sub-slot 54*c* that the receiver also takes an RSSI measurement that may be used as described above to determine the best particular RF channel to employ on links between devices (and, optionally, in combination with the open listen embodiment described above for additional RF interference detection measurements). Following Tx sub-slot 34c, the transmitter node switches its radio from transmit to receive during Tx-to-Rx sub-slot 36c and then begins listening for an acknowledgement signal from the receiving node during ACK/NACK Listen sub-slot 38c confirming successful receipt of the data packet. If the receiving node successfully receives the data packet, during Tx Listen sub-slot 54c, it switches its radio from receive to transmit during Rx-to-Tx sub-slot 56c and then sends an ACK response to the transmitter node during Tx ACK/NACK sub-slot 58c. Alternatively, if the receiving node unsuccessfully receives the data packet due to a pre-defined error condition during Tx Listen sub-slot 54c, it switches its radio from receive to transmit during Rx-to-Tx sub-slot 56c and then sends a NACK response to the transmitter node during Tx ACK/NACK sub-slot 58c. ACK/NACK Listen sub-slot 38c is long enough to accommodate the length of Rx-to-Tx sub-slot 56c and Tx ACK/NACK sub-slot. This ensures that all of ACK/NACK sub-slot 58c will fall within ACK/NACK Listen sub-slot 38c.

Following ACK/NACK Listen sub-slot 38c, during Tx Quiet sub-slot 40, the transmitter node performs an RSSI measurement using the ED function described above and stores the measurement, as well as the time of measurement and RF channel. ACK/NACK Listen sub-slot 38c delays Tx Quiet sub-slot 40 long enough to ensure the receiver node will not transmit an ACK or a NACK response at the same time as the RSSI measurement of Tx Quiet sub-slot 40. Importantly, because the same transmitter time slot 30c and receiver time slot 50c are part of the same network timeslot present in all wireless devices in the network, the network is totally silent on all RF channels during the RSSI measurement of Tx Quiet sub-slot 40. The Tx Quiet sub-slot 40 RSSI measurements will indicate background levels of RF noise or the presence of RF interference. As with the RSSI measurement of Rx Quiet sub-slot 52, because the network is totally silent during the RSSI measurement of Tx Quiet sub-slot 40, this is not a time when the transmitter node receives a signal resulting from the transmission by the receiver node of either an ACK or a NACK response.

Alternatively, the Rx Quiet sub-slot can be scheduled within Rx Empty sub-slot 60c beyond the end of ACK/NACK Listen sub-slot 38c. FIGS. 3A and 3C illustrate this alternative complementary arrangement of quiet sub-slots within a time slot for a transmitter node and a receiver node, respectively. All is the same as for the description above with respect to FIGS. 3A and 3B, except that Rx Quiet sub-slot 52 has been replaced with Rx Quiet sub-slot 62. Rx-Quiet sub-slot 62 is illustrated at the very end of ACK/NACK Listen sub-slot 38c, coincident with Tx Quiet sub-slot 40, but can be anywhere within Rx Empty sub-slot 60c. As with the RSSI measurements of Rx Quiet sub-slot 52 and Tx Quiet sub-slot 40, because the network is totally silent during the RSSI measurement of Rx Quiet sub-slot 62, this is not a time when the transmitter node receives a signal resulting from the transmission by the receiver node of either an ACK or a NACK response. This alternative is particularly useful for TMDA protocols which, unlike WirelessHART®, begin transmitting first and then activate receivers to listen for transmissions. Such protocols are useful in networks with very few transmissions. In such networks, the extra energy used for a single transmission preamble long enough to be transmitting when receivers are eventually turned on is more than compensated for by the energy savings from the shorter time during which the many receivers must listen before shutting down. For such a protocol, Rx Quiet sub-slot 52 would not always be during a time when the network is totally silent, but Rx Quiet sub-slot 62 would still be during a time when the network is totally silent.

In the previous embodiments, the measurements taken during the intra-network quiet times are temporarily stored in the wireless devices taking the measurements and not discarded until values representing the received RF power measurements and values representing the corresponding times of measurement are determined. Referring again to FIG. 1, the values representing the RF power measurements and the values representing the corresponding times of measurement are not discarded until successfully transmitted to CSWM 26 in a report (RSSI report). Periodically, for example, every 15 minutes, each of wireless devices 20a-20i . . . 20N of wireless field device mesh network 18 and access point 22 determine values representing the received RF power measurements and the values representing the corresponding times of measurement of the temporarily stored RSSI measurement values and times of each measurement for the time period. The values representing the received RF power measurements are determined for each RF channel measured during the period. After the values representing the received RF power measurements and the values representing the corresponding times of measurement for each RF channel are determined and temporarily stored, each of wireless devices 20a-20i . . . 20N of wireless field device mesh network 18 sends an RSSI report of the values representing the received RF power measurements and the values representing the corresponding times of measurement for each RF channel through wireless field device mesh network 18 from node to node over one of several paths until they arrive at access point 22. In this embodiment, access point 22 then sends the RSSI reports over dedicated link 28 to gateway 16 and CSWM 26 running on gateway 16. (Alternatively, gateway 16 forwards the reports to CSWM 26 if CSWM 16 is instead running elsewhere, for example, on host computer 12.) Likewise, access point 22 performs the same types of measurements, determinations and RSSI report generation as each of wireless devices 20a-20i . . . 20N and sends an RSSI report periodically over dedicated link 28 to gateway 16 and CSWM 26. Since access points are not typically energy limited devices, they are free to gather more data, as well as to report more data more often than a typical wireless device. CSWM 26 responds to a successful receipt of the RSSI report from each wireless device 20a-20i . . . 20N and access point 22 by sending a return message to each wireless device 20a-20i . . . 20N and access point 22 acknowledging the successful receipt of the report. Alternatively, a neighboring node for each of wireless devices 20a-20i . . . 20 N and access point 22 responds to the successful receipt of the RSSI report wireless device 20a-20i . . . 20N and access point 22 by sending a return message acknowledging the successful receipt of the report or portion of the report. In either case, upon receiving the return message acknowledging the successful receipt, each wireless device 20a-20i . . . 20N and access point 22 discards the values representing the RF power measurements and the values representing the corresponding times of measurement for each RF channel for the time period. In the meantime, each wireless device 20a-20i . . . 20N and access point 22 has already begun taking new RSSI measurements, generating new values representing the received RF power measurements and building a new RSSI report for a new time period.

Transmitting the RSSI reports for each wireless device 20a-20i . . . 20N at essentially the same time would result in taking all or part of the control and process monitor functions of the control and process monitoring system 10 offline to accommodate such a burden on the transmission capacity of wireless field device mesh network 18. Instead, network manager 24 schedules the timing of transmissions of the reports (and indirectly the receipt confirmation messages) for each wireless device 20a-20i . . . 20N in a staggered fashion, such that the added transmission burden is well within the transmission capacity of wireless field device mesh network 18.

Once CSWM 26 receives an RSSI report from at least some of the wireless devices 20a-20i . . . 20N and from access point 22, it determines baseline statistical values of the received RF power measurement for each RF channel. Without active interference sources present, baseline statistical values are typically near the receive threshold limit of the radios used in the devices (e.g., −90 dBm for most IEEE 802.15.4 transceivers). It compares reported RF power measurements to corresponding baseline statistical values. Reported RF power measurements which exceed corresponding baseline statistical values by a given amount indicate a source of RF interference and cause CSWM 26 to issue an alert over high-speed network 14 to software application 29 running on host computer 12. The given amount can be a user defined received RF power threshold limit. In addition, CSWM 26 combines and correlates reported RF power measurements indicative of a source of RF interference from at least three wireless devices and employs standard triangulation calculations known in the art to determine the location of the source of RF interference. For example, wireless device 20a-20i . . . 20N report only statistical values and corresponding measurement times, including maximum received RF power values and times of the maximum RF power values for each RF channel. Wireless devices 20h and 20i report received RF power measurement maximum values that exceed a previously defined RF power threshold value. Wireless device 20g is the next nearest and, although its reported received RF power maximum value does not exceed the previously defined RF power threshold value, it still has a slightly elevated reported RF power maximum value compared to the baseline value. CSWM 26 compares the received RF power maximum values of 20h, 20i, and 20g and, using the well known standard triangulation calculations, determines the location of RF interference source R1. The location of the RF interference source R1 is sent with the alert to software application 29 running on host computer 12 over high-speed network 14. Alternatively, the alert and the location of RF interference source R1 are displayed on gateway 16 for use by a system operator. In this example, by transmitting only statistical information, rather than each measurement, and only reporting on a periodic basis, for example, every 15 minutes, this embodiment minimizes the energy impact on any single node necessary to provide detection and location of RF interference throughout the network on a regular, ongoing, essentially continuous basis.

Another embodiment of the present invention for detecting RF interference when the RSSI measurements are recorded during an intra-network quiet time is during an "open channel slot." An open channel slot is a RF channel unassigned by the network manager during a time slot. During this open channel slot, no device in the wireless field device mesh network is scheduled by the network manager to transmit on the RF channel. Other links may be communicating during the same time slot on the other RF channels, but no link will operate on the open channel. During open channel slots, one or more of the wireless devices not assigned to a link during the time slot is directed by the network manager to take an RSSI measurement on one or more of the open channels. In cases in which all RF channels are open during a particular open time slot, the network manager may direct a device (or devices) to make RSSI measurements on all RF channels. Because no device in the wireless field device mesh network is transmitting on the open channels during the time slot, this is a quiet time for intra-network traffic on those open channels.

Referring to FIG. 1, network manager 24 coordinates RSSI measurements in wireless field device mesh network 18 during open channel slots. Network manager 24 sends instructions to each of wireless devices 20a-20i . . . 20N of wireless field device mesh network 18 and access point 22 to take a series of RSSI measurements on at least one of several assigned RF channels during a time slot or time slots not allocated for network communication and to store the RSSI measurement values and the time of measurements in the devices taking the measurement. Once the RSSI measurement data and times of measurement are gathered, each of wireless devices 20a-20i . . . 20N and access point 22 determine values representing the received RF power measurements and the values representing the corresponding times of measurement of the temporarily stored RSSI measurement values and times of each measurement for the time period. The values representing the RF power measurements are determined for each RF channel measured during the period. After the values representing the RF power measurements and the values representing the corresponding times of measurement for each RF channel are determined and temporarily stored, each of wireless devices 20a-20i . . . 20N of wireless field device mesh network 18 sends an RSSI report of the values representing the RF power measurements and the values representing the corresponding times of measurement for each RF channel through wireless field device mesh network 18 from node to node over one of several paths until it arrives at access point 22. Access point 22 then sends the RSSI report from each wireless device 20a-20i . . . 20N, in addition to its own RSSI report, over dedicated link 28 to gateway 16 and CSWM 26. CSWM 26 responds to a successful receipt of the RSSI report from each wireless device 20a-20i . . . 20N and access point 22 by sending a return message to each wireless device 20a-20i . . . 20N and access point 22 acknowledging the successful receipt of the report. Alternatively, a neighboring node for each of wireless devices 20a-20i . . . 20 N and access point 22 responds to the successful receipt of the RSSI report wireless device 20a-20i . . . 20N and access point 22 by sending a return message acknowledging the successful receipt of the report. In either case, upon receiving the message confirming the successful receipt, each wireless devices 20a-20i . . . 20N and access point 22 discards the values representing the received RF power measurements and the values representing the corresponding times of measurement for each RF channel for the requested series of RSSI measurements. Network manager 24 schedules the timing of transmissions of the RSSI reports and the receipt confirmation messages in a staggered fashion, such that the added transmission burden is well within the transmission capacity of wireless field device mesh network 18.

At times when RF interference information is needed, this embodiment of the present invention is able to develop a map of RF interference across the ISM spectrum throughout a wireless field device mesh network while limiting disruptions in the normal operation of the network. This is particularly useful at times and locations where few time slots are allocated for communication, either to save energy, or because more frequent communication is not required. Because of the limited energy generally available to locally-powered wireless devices in a wireless field device mesh network, this embodiment is employed on an as-needed basis rather than the continuous basis of the previous embodiments.

These various embodiments are uniquely well suited to detecting and locating transient RF interference because the RSSI reports from the wireless devices include values representing the corresponding times of RF measurement which are coordinated across control and process monitoring system 10 by network manager 24 to an accuracy of approximately one millisecond, as, for example in WirelessHART®. CSWM 26 combines the RSSI reports from at least three wireless devices indicative of a source of RF interference within the same time frame by comparing the corresponding times of RF measurement of each and employs the standard triangulation calculations known in the art to determine the location of the source of RF interference. CSWM 26 compares a series of locations to identify transient or mobile sources of RF interference by, for example, plotting RSSI data on a trend line, generating spectrum graphs by RF channel, highlighting interference source location on a map, or by showing movement of location on a map over time.

Figure 4:
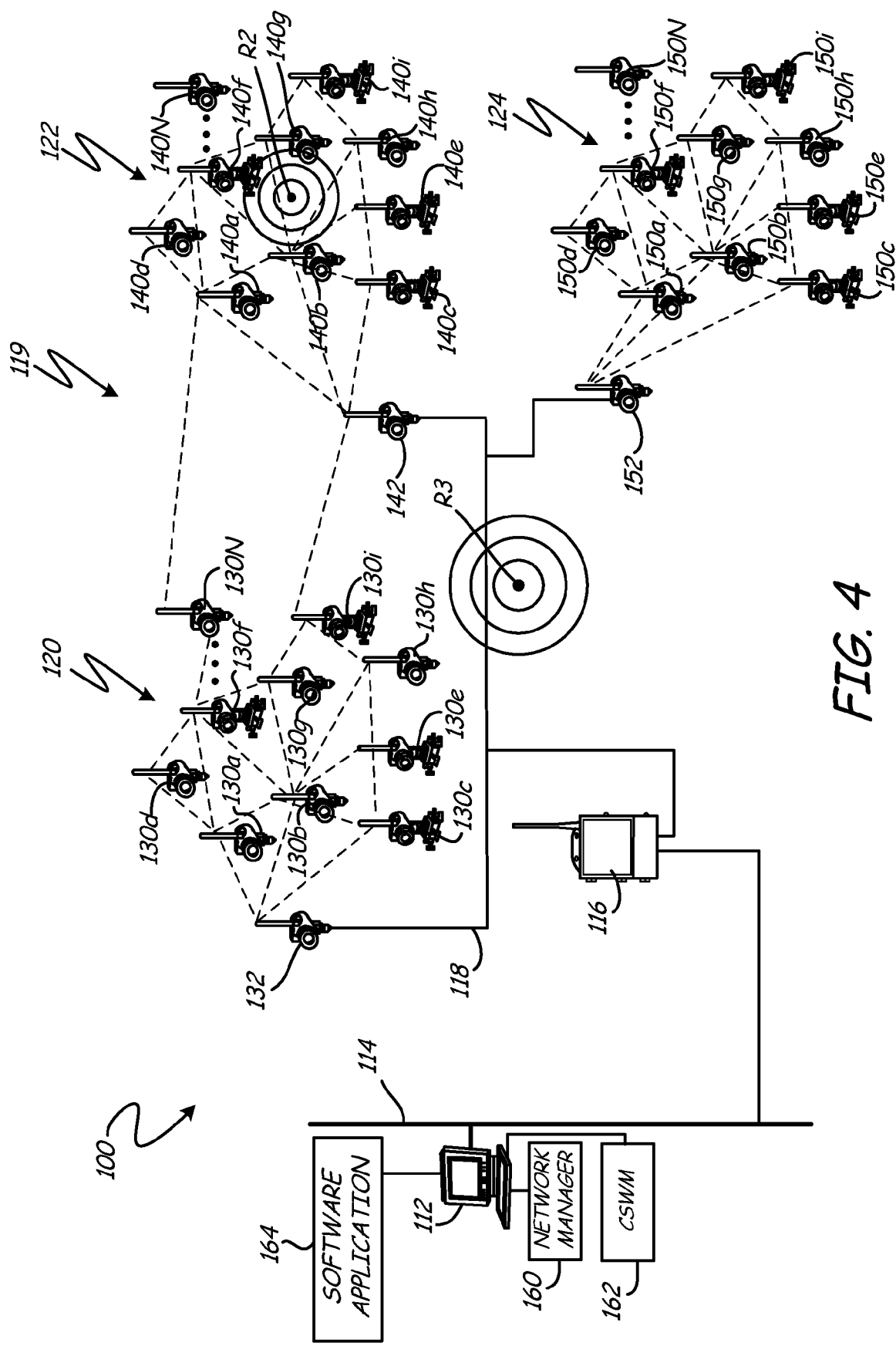
FIG. 4 is a diagram illustrating an implementation of the present invention for measuring and analyzing RF interference proximate and within a wireless field device mesh network with multiple access points, whether areas of the mesh network served by the access points are partially overlapping or not.

FIG. 4 is a diagram illustrating another embodiment of the present invention for measuring and analyzing RF interference proximate and within a wireless field device mesh network with multiple access points, whether areas of the mesh network served by the access points are partially overlapping or not. Because access points have a limited capacity to relay communications into and out of a wireless field device mesh network, larger control and process monitoring systems require multiple access points to handle increasing the number of nodes in a network or to unify otherwise separate wireless field device mesh networks, each with its own access point. According to one embodiment, FIG. 4 shows control and process monitoring system 100 which includes host computer 112, first high-speed network 114, gateway 116, second high-speed network 118 and wireless field device mesh network 119. Wireless field device mesh network 119 comprises wireless field device mesh network areas 120, 122, and 124. Wireless field device mesh network area 120 includes wireless devices or nodes 130*a*-130*i* . . . 130N and access point 132. Wireless field device mesh network area 122 includes wireless devices or nodes 140*a*-140*i* . . . 140N and access point 142. Wireless field device mesh network area 122 is shown partially overlapping wireless field device mesh network area 120, but may be totally overlapping or totally separate from 120. Wireless field device mesh network area 124 includes wireless devices or nodes 150*a*-150*i* . . . 150N and access point 152. Host computer 112 includes network manager 160 and CSWM 162, although alternately either or both may reside on gateway 116. Host computer 112 also includes software application 164. Software application 164 is, for example, control software or monitoring software. Also present in FIG. 4 are interference sources R2 and R3.

Messages are communicated from host computer 112 to gateway 116 over first high-speed network 114. A message destined for a node in one of wireless field device mesh network areas 120, 122, and 124 is sent from gateway 116 to one of access points 132, 142, and 152, respectively, over second high-speed network 118. One of access points 132, 142, and 152 then transmits the message either directly or in a hop-by-hop fashion to the one of wireless devices 130*a*-130*i* . . . 130N, 140*a*-140*i* . . . 140N, and 150*a*-150*i* . . . 150N of wireless field device mesh network areas 120, 122, and 124, respectively, over one of several different paths. Return messages follow the reverse path back to host computer 112. Time slot, link assignments, and RF channel assignments between nodes necessary to coordinate communications throughout wireless field device mesh network 119 are allocated by network manager 160 running on host computer 112.

Embodiments of this implementation of the present invention employ RSSI measurements made during an intra-network quiet time during at least one of an open listen, an open channel slot, and a quiet sub-slot, as described above in reference to FIGS. 1, 2A-2D, and 3A-3B.

The RSSI measurement values and the time of each measurement and RF channels are temporarily stored in the devices taking the measurements and are not discarded until values representing the received RF power measurements and values representing the corresponding times of measurement are determined. Referring again to FIG. 4, the values representing RF power measurements and the values representing the corresponding times of measurement are not discarded until successfully transmitted to CSWM 162 in a report (RSSI report) or, alternatively, to a neighboring node. Periodically, for example, every 15 minutes, each of the wireless devices and access points of wireless field device mesh network 119 determines values representing the received RF power measurements and values representing the corresponding times of measurement for the time period. The values representing the received RF power measurements are determined for each RF channel measured during the period. After the values representing the received RF power measurements and the values representing the corresponding times of measurement for each RF channel are determined, each of the wireless devices of wireless field device mesh network areas 120, 122, and 124 transmits an RSSI report of the values representing the received RF power measurements and values representing the corresponding times of measurement for each RF channel through wireless field device mesh network areas 120, 122, and 124 from node to node over one of several paths until they arrive at any one of access points 132, 142, or 152. Access points 132, 142, and 152 then send the RSSI report from each wireless device in wireless field device mesh network areas 120, 122, and 124, in addition to their own RSSI report, to gateway 116 over second high-speed network 118. Gateway 116 sends the report over first high-speed network 114 to CSWM 162 on host computer 112. CSWM 162 responds to a successful receipt of the RSSI report from each wireless device in wireless field device mesh network areas 120, 122, and 124 and access points 132, 142, and 152 by sending a return message acknowledging the successful receipt of each RSSI report. Alternatively, a neighboring node for each wireless device in wireless field device mesh network areas 120, 122, and 124 and access points 132, 142, and 152 responds to the successful receipt of the RSSI report by sending a return message acknowledging the successful receipt of the report. In either case, upon receiving the message acknowledging the successful receipt, each wireless device in wireless field device mesh network areas 120, 122, and 124 and access points 132, 142, and 152 discards the stored values representing the received RF power measurements and the values representing the corresponding times of measurement for each RF channel for the time period. Network manager 160 schedules the timing of transmissions of RSSI reports and the receipt confirmation messages in a staggered fashion, such that the added transmission burden is well within the transmission capacities of wireless field device mesh network 119.

Once CSWM 162 receives the RSSI report from each wireless device in wireless field device mesh network areas 120, 122, and 124 and access points 132, 142, and 152, it determines baseline statistical values of the RSSI measurement for each RF channel. Without active interference sources present, baseline statistical values are typically near the receive threshold limit of the radios used in the devices (e.g., −90 dBm for most IEEE 802.15.4 transceivers). It compares reported RF power measurements to corresponding baseline statistical values. Reported RF power measurements which exceed corresponding baseline statistical values by a given amount indicate a source of RF interference and cause CSWM 162 to issue an alert to software application 164 on host computer 112. With respect to detecting and analyzing interference source proximate or within a single area of the wireless field device mesh network, such as RF interference source R2, the present embodiment operates much like the first embodiment described above with reference to FIG. 1. For example, wireless devices 140b, 140f, and 140g report statistical values and corresponding measurement times, including maximum received RF power values and times of the maximum RF power values for each RF channel (as part of the RSSI reports) to gateway 116 by way of access point 142 (or access point 132 through the overlap between wireless field device mesh network areas 122 and 124) and second high-speed network 118 that exceed a previously defined received RF power threshold value. Gateway 116 sends the reports to CSWM 162 over first high-speed network 114. CSWM 162 compares the received RF power maximum values of 140b, 140f, and 140g and corresponding measurement times using the well known standard triangulation calculations, and determines the location of RF interference source R2. Preferably, the location of the RF interference source R2 is sent with an alert to software application 164 running on host computer 112. Alternatively, the alert and the location of RF interference source R2 are transmitted over first high-speed network 114 and displayed on gateway 116 for use by a system operator.

Unlike the embodiments described with reference to FIG. 1, this embodiment also detects and locates sources of RF interference from beyond a single wireless field device mesh network area 120, 122 and 124, such as RF interference source R3, using information from wireless devices or multiple access points from throughout wireless field device mesh network 119. Because network manager 160 coordinates the time slots and RF channel assignments for all wireless field devices and access points in wireless field device mesh network 119 within one millisecond accuracy throughout as, for example, in WirelessHART®, RF interference information from wireless devices or access points from different portions of wireless field device mesh network 119 can be precisely combined to provide an accurate location of RF interference source R3. In the example of RF interference source R3, the three wireless devices with the most detected RF energy from the source are wireless field device 130h of wireless field device mesh network area 120, access point 142 of wireless field device mesh network area 122, and access point 152 of wireless field device mesh network area 124. Wireless device 130h, via access point 132; access point 142; and access point 152 report maximum RF power values and times of the maximum RF power values for each RF channel (as part of the RSSI reports) to gateway 116 over second high-speed network 118 that exceed a previously determined received RF power threshold value. Gateway 116 sends the reports to CSWM 162 over first high-speed network 114. CSWM 162 compares the maximum RF power values and times of the maximum RF power values for each RF channel from wireless device 130h, access point 142, and access point 152 and, using the well known standard triangulation calculations, determines the location of RF interference source R3. The location of the RF interference source R3 is sent with an alert to software application 164 running on host computer 112. Alternatively, the alert and the location of RF interference source R3 are sent over first high-speed network 114 and displayed on gateway 116 for use by a system operator.

In this embodiment, RF interference information from wireless devices or access points from different single wireless field device mesh network areas of a wireless field device mesh network can be precisely combined to provide an accurate location of RF interference over a larger area on a continuous basis, because the network manager coordinates the time slots and RF channel assignments for the wireless field device mesh network throughout the control and process monitoring system within one millisecond accuracy.

In all embodiments of the present invention, standard triangulation calculations using information from three wireless devices (or access points) are ideal for locating an interference source in two dimensions because they identify a single location. Combining information from more than three devices improves the location accuracy of the present invention. However, should only two wireless devices detect the interference source, information from two wireless devices is nearly as useful if combined with non-RF characteristic information. For example, one of two possible locations of the source of RF interference found from RSSI measurements indicative of a source of RF interference from two wireless devices is ruled out if it is within a secured area, inaccessible to a potential source of RF interference.

As mentioned above, the CSWM is able to display RF interference information on a host computer or gateway by, for example, plotting RSSI data on a trend line, generating spectrum graphs including spectrum density and RF history, highlighting interference source locations on a map, illustrating the duty cycle of an interference source, showing interference RSSI by channel by node, comparing link-by-link interference RSSI to intra-network RSSI by channel, using bar graphs to illustrate path stability as a function of interference RSSI, or by showing movement of location on a map over time. The CSWM is able to display combinations as well, showing the network topology (e.g. nodes, links, routes) overlaid with interference sources and interference RSSI. In addition, the CSWM is able to combine values representing received RF power measurements and values representing the corresponding times of measurement to generate a multipoint gradient map, similar to a heat map. The multipoint gradient map displays, in various colors or shades, values representing levels of received RF power measurements for an assigned RF channel at a corresponding time of measurement or range of corresponding times of measurement for the known locations of the wireless devices taking the measurements. The multipoint gradient map covers all or a portion of the wireless field device mesh network, providing an easy to interpret visual indication of RF background and RF interference levels.

For all embodiments of the present invention, RSSI reporting is configurable, ranging from intermittent reporting, for example, the 15 minute report cycle described in reference to the open listen and the quiet sub-slot embodiments; to active reporting, such as described above for the open channel slot embodiment, where the requested series of RSSI measurements are made and values returned with little delay. It is understood that RSSI measurements may employ the three intra-network quiet times described above singularly or in any combination and that, in all cases, the frequency and responsiveness of RSSI reporting can be configured independently, from intermittent to active, for each of the intra-network quiet times employed. Further, it is also understood that RSSI reporting requests may also filter the RSSI readings employed to create an RSSI report by specifying a defined range of RF power measurements and discarding all RSSI readings outside of the defined range. All RSSI reporting requests originate from the CSWM and are coordinated and implemented by the network manager.

In all embodiments, a wireless device or an access point with a local operator interface (LOI) is able to display any actual RSSI measurements made by the wireless device or the access point and any values representing received RF measurements determined from the RSSI measurements as described above by the wireless device or the access point. The information displayed is only that retained in local memory in accordance with the embodiments described above.

In all embodiments, should additional RSSI measurements be necessary to better identify the location of a source of RF interference, a hand-held wireless device comprising a radio with received RF power measurement capability, such as, for example, a radio that complies with the IEEE 802.15.4 standard, may be employed. The hand-held wireless device coordinates with the network manager to communicate with the network manager through the local wireless field device mesh network to identify times other than during the reception of a signal resulting in transmission by wireless devices of either an ACK or a NACK response, such as during open listens, quiet sub-slots or open channel slots. The hand-held wireless device takes RSSI measurements in the local wireless field device mesh network on RF channels selected by the user of the hand-held wireless device. Actual RSSI measurements and statistical values are displayed on the hand-held wireless device.

In addition to detecting and locating sources of RF interference, the present invention, with its channel-by-channel RF spectrum analysis, also identifies a source of a detected RF interference by determining the strength of RF interference for each RF channel and creating an RF spectrum signature for the RF interference. By comparing the RF spectrum signature of the RF interference against RF spectrum signatures of known sources of RF interference, the source of the RF interference is identified. The characterization is done by the CSWM for common types of interference sources, such as Wi-Fi. The CSMW of the present invention also identifies a source of a detected RF interference by employing the values representing the corresponding times of measurement of a detected RF interference to determine a temporal pattern to the RF interference, for example, RF interference every 90 minutes or every Thursday at 2:00 p.m. The temporal pattern is compared to temporal patterns of known sources of RF interference to identify the source of the RF interference. As with other types of RF interference information discussed above, the CSWM is able to display the interference source types and temporal pattern information on the host computer or gateway.

The present invention uses the received RF power measurement capability available in wireless devices comprising a wireless field device mesh network to detect sources of RF interference. The present invention employs the wireless devices to take multiple RSSI measurements on each RF channel during intra-network quiet times, such as during open listens, quiet sub-slots or open channel slots. During these times, background or external RF interference is most easily and accurately detected. Values representing the received RF power measurements are determined by the wireless devices from the received RF power measurements and the values are sent in periodic reports to the CWSM or, alternatively, in response to a specific request from the CWSM, coordinated and implemented by the network manager. This results in the efficient collection of accurate RF interference measurement statistics useful to detect sources of RF interference and the flexibility for an operator to adapt the system to focus data collection and analysis on a specific location, RF band or time period. By combining the values representing the RF power measurements and values representing the corresponding times of measurement for each RF channel from multiple devices, the background noise and RF spectrum of the entire network can be analyzed over any time interval, on a channel-by-channel basis. Locations of RF interference sources are found by combining this analysis with known wireless device locations and using standard location and triangulation algorithms. In addition, the nature of an RF interference source is found by matching the analysis with RF signatures of common types of interference sources, such as Wi-Fi.

The present invention minimizes the energy burden on each node necessary to provide detection and location of RF interference when reporting only statistical information, rather than each measurement. By moving between open listen, open channel slot, and quiet sub-slot measurements, a need for more aggressive interference detection and location can be balanced against the energy usage required. Also, limiting data collection and reporting to a few nodes or nodes which are generously powered, such as access points, minimizes the energy burden on the majority of the battery-powered nodes. In addition, RF interference information from wireless devices or access points from different wireless field device mesh network areas can be precisely combined to provide an accurate location of RF interference over a larger area on a continuous basis, because the network manager coordinates the time slots and RF channel assignments for all wireless field device mesh network areas throughout the control and process monitoring system within one millisecond accuracy. Finally, by coordinating the transmissions of RSSI reports and the receipt confirmation messages in a staggered fashion, such that the added transmission burden is well within the transmission capacities of wireless field device mesh network, there is little negative impact on the operation of the network.

The present invention has been described using the example of radios that comply with the IEEE 802.15.4 standard. However, the present invention is understood to encompass other wireless communications protocols that have a received RF strength measurement function.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for measuring and analyzing radio frequency (RF) interference proximate and within a wireless field device network, the method comprising:
    coordinating RF channel assignments and coordinating and synchronizing times of measurement; wherein a network manager coordinates RF channel assignments and coordinates and synchronizes times of measurement throughout the wireless field device network;
    measuring received RF power on an assigned RF channel with at least one of a plurality of wireless devices comprising the wireless field device network;
    storing the measurement of received RF power measured on the assigned RF channel and a corresponding time of measurement within the at least one of the plurality of wireless devices if the measurement of RF power on the assigned RF channel was not during reception of a signal resulting in transmission by the at least one of the plurality of wireless devices of one of an acknowledgement signal and a non-acknowledgement signal;

determining within the at least one of the plurality of wireless devices values representing the received RF power measurements on the assigned RF channel and values representing the corresponding times of measurement from the stored measurements of RF power and the stored corresponding times of measurement;

discarding the measurements of received RF power and the corresponding times of measurement stored within the at least one of the plurality of wireless devices after determining the values representing the received RF power measurements on the assigned RF channel and values representing the corresponding times of measurement from the stored measurements of received RF power and the stored corresponding times of measurement;

reporting from the at least one of the plurality of wireless devices the values representing the received RF power measurements on the assigned RF channel and the values representing the corresponding times of measurement to a centralized software module (CSWM);

receiving at the at least one of the plurality of wireless devices a signal acknowledging successful reporting of the values representing the received RF power measurements on the assigned RF channel and the values representing the corresponding times of measurement; and discarding the values representing the received RF power measurements on the assigned RF channel and the values representing the corresponding times of measurement within the at least one of the plurality of wireless devices upon receipt of the signal acknowledging successful reporting of the values representing the received RF power measurements on the assigned RF channel and the values representing the corresponding times of measurement.

2. The method of claim 1, further comprising running the CSWM and the network manager each on at least one of a gateway and a host computer.

3. The method of claim 1, wherein reporting the values representing the received RF power measurements on the assigned RF channel and the corresponding times of measurement to the CSWM comprises transmitting a report through the wireless field device network in a staggered fashion.

4. The method of claim 1, wherein reporting the values representing the received RF power measurements on the assigned RF channel and corresponding times of measurement to the CSWM occurs at a rate configurable by the network manager.

5. The method of claim 1, wherein the corresponding time of measurement is during a portion of a time slot when communication on the assigned RF channel is scheduled and the at least one of the plurality of wireless devices does not transmit an acknowledgement signal or a non-acknowledgement signal during the time slot.

6. The method of claim 1, wherein the corresponding time of measurement is during a time slot when no communication on the assigned RF channel is scheduled throughout the wireless field device network.

7. The method of claim 1, wherein the corresponding time of measurement is during a portion of a time slot when no communication on any RF channel is scheduled for the portion of the time slot throughout the wireless field device network.

8. The method of claim 1, wherein the signal acknowledging successful reporting of the values representing the received RF power measurements on the assigned RF channel and the values representing the corresponding times of measurement originates from at least one of a neighboring node and the CSWM.

9. The method of claim 1, further comprising displaying the values representing the received RF power measurements of the assigned RF channel on a multipoint gradient map.

10. The method of claim 1, further comprising displaying on a local operator interface at least one of:
measurements of received RF power measured on the assigned RF channel and the corresponding time of measurement; and
values representing the received RF power measurements on the assigned RF channel.

11. The method of claim 1, further comprising:
monitoring at the CSWM the reported values representing the received RF power measurements and the values representing the corresponding times of measurement on the assigned RF channel;
detecting RF interference when at least one of the monitored values representing the received RF power measurements exceeds a predetermined value; and
generating an alert from the CSWM notifying at least one of a system operator and a control or monitoring software application running on a host computer of the RF interference.

12. The method of claim 11, further comprising:
analyzing at the CSWM the reported values representing the received RF power measurements and the values representing the corresponding times of measurement on the assigned RF channel of the detected RF interference;
creating an RF spectrum signature at the CSWM for the RF interference from the analyzed values;
comparing the RF spectrum signature for the of RF interference with a plurality of RF spectrum signatures at the CSWM, each of the plurality of RF spectrum signatures identifying a known source of RF interference;
identifying the source of RF interference from the compared RF spectrum signatures.

13. The method of claim 11, further comprising:
analyzing at the CSWM the reported values representing the received RF power measurements and the values representing the corresponding times of measurement on the assigned RF channel of the detected RF interference;
determining a temporal pattern for the RF interference from the analyzed values at the CSWM;
comparing the temporal pattern for the of RF interference with a plurality of RF temporal patterns at the CSWM, each of the plurality of RF temporal patterns identifying a known source of RF interference;
identifying the source of RF interference from the compared RF temporal patterns.

14. The method of claim 1, wherein determining values representing the received RF power measurements on the assigned RF channel comprises calculating statistical values within the at least one of the plurality of wireless devices of the stored measurements of received RF power and the stored corresponding times of measurement, wherein calculating statistical values comprises calculating at least one of maximum, minimum, average, standard deviation and variance values of the stored measurements of received RF power.

15. The method of claim 14, further comprising:
comparing at the CSWM the calculated statistical values and the corresponding times of measurement for the assigned RF channel from at least two of the plurality of wireless devices, wherein at least two of the plurality of wireless devices are at locations known to the CSWM;
determining two possible locations of a source of RF interference on the assigned RF channel at the CSWM from the compared calculated statistical values and times and from the known locations of the at least two of the plurality of wireless devices;
comparing non-RF interference characteristics of the two possible locations of the source of RF interference on the assigned RF channel at the CSWM to determine a location of the source of RF interference; and
reporting the location of the source of the RF interference to at least one of a system operator and a control or monitoring software application running on a host computer.

16. The method of claim 14, further comprising:
comparing at the CSWM the calculated statistical values and the corresponding times of measurement for the assigned RF channel from at least three of the plurality of wireless devices, wherein at least three of the plurality of wireless devices are at locations known to the CSWM;
determining a location of a source of RF interference on the assigned RF channel at the CSWM from the compared calculated statistical values and times and from the known locations of the at least three of the plurality of wireless devices; and
reporting the location of the source of the RF interference to at least one of a system operator and a control or monitoring software application running on a host computer.

17. The method of claim 16, wherein the locations of the at least three of the plurality of wireless devices are fixed locations.

18. A system for measuring and analyzing radio frequency (RF) interference proximate and within a wireless field device network, the system comprising:
a centralized software module (CSWM) for collecting and analyzing values representing received RF power measurements on an assigned RF channel and values representing corresponding times of the received RF power measurements;
a plurality of wireless devices, each wireless device measuring received RF power and a corresponding time of measurement on the assigned RF channel; storing the measurement of received RF power if the measurement is not during reception of a signal resulting in transmission by the wireless device of one of an acknowledgement signal and a non-acknowledgement signal; employing the stored received RF power measurement and the corresponding time of measurement to determine the values representing the received RF power measurements and the values representing the corresponding times of measurement for the assigned RF channel; wherein the stored received RF power measurement and the corresponding time of measurement are stored in the wireless device until the values representing the received RF power measurements and the values representing the corresponding times of measurement for the assigned RF channel are determined; wherein the values representing the received RF power measurements and the values representing the corresponding times of measurement are stored in the wireless device until receipt of a signal acknowledging successful reporting of the values representing received RF power measurements on the assigned RF channel and values representing corresponding times of the received RF power measurements from the wireless device; and
a network manager for coordinating communications between the plurality of wireless devices, coordinating RF channel assignments, and coordinating and synchronizing the corresponding times of measurement throughout the wireless field device network.

19. The system of claim 18, wherein each wireless device stores the measurement of received RF power if the measurement is within a defined range of RF power measurements.

20. The system of claim 18, wherein each wireless device provides the values representing received RF power measurements and the values representing corresponding times of measurement and the assigned RF channel to the CSWM as by transmitting a report through the wireless field device network in a staggered fashion coordinated by the network manager.

21. The system of claim 18, wherein each wireless device provides the values representing received RF power measurements and the values representing corresponding times of measurement and the assigned RF channel to the CSWM at a rate configurable by the network manager.

22. The system of claim 18, wherein each wireless device stores the measurement of received RF power if the measurement is during a portion of a time slot when communication on the assigned RF channel is scheduled and the wireless device does not transmit an acknowledgement signal or a non-acknowledgement signal during the time slot.

23. The system of claim 18, wherein each wireless device stores the measurement of received RF power if the measurement is during a time slot when no communication on the assigned RF channel is scheduled throughout the wireless field device network.

24. The system of claim 18, wherein each wireless device stores the measurement of received RF power if the measurement is during a portion of a time slot, wherein no communication on any RF channel is scheduled for the portion of the time slot throughout the wireless field device network.

25. The system of claim 18, wherein the network manager coordinates the corresponding times of measurement throughout the wireless field device network such that the corresponding times of measurement are during at least one of:
a portion of a first time slot when communication on the assigned RF channel is scheduled and the wireless device does not transmit an acknowledgement signal or a non-acknowledgement signal during the first time slot;
a second time slot when no communication on the assigned RF channel is scheduled throughout the wireless field device network; and
a portion of a third time slot, wherein no communication on any RF channel is scheduled for the portion of the third time slot throughout the wireless field device network.

26. The system of claim 18, wherein the network manager coordinates the corresponding times of measurement throughout the wireless field device network such that the corresponding times of measurement are during at least one of:
a first portion of a first time slot, wherein no communication on any RF channel is scheduled for the first portion of the first time slot throughout the wireless field device network;

a second portion of the first time slot when communication on the assigned RF channel is scheduled and the wireless device does not transmit an acknowledgement signal or a non-acknowledgement signal during the first time slot; and a second time slot when no communication on the assigned RF channel is scheduled throughout the wireless field device network.

27. The system of claim 18, wherein the signal acknowledging successful reporting of the values representing received RF power measurements on the assigned RF channel and values representing corresponding times of the received RF power measurements from the wireless device originates from at least one of a neighboring node and the CSWM.

28. The system of claim 18, wherein at least one of the plurality of wireless devices further comprises a local operator interface, the local operator interface capable of displaying at least one of:
   measurements of received RF power measured on the assigned RF channel and the corresponding time of measurement; and
   values representing the received RF power measurements on the assigned RF channel.

29. The system of claim 18, further comprising a hand-held wireless device, the hand-held wireless device measuring received RF power and a corresponding time of measurement on a user-selected RF channel if the measurement of RF power on the selected RF channel is not during reception of a signal resulting in transmission by the hand-held wireless device of one of an acknowledgement signal and a non-acknowledgement signal; wherein the network manager coordinates communications between the plurality of wireless devices and the hand-held wireless device and coordinates and synchronizes the corresponding times of measurement for the hand-held wireless device.

30. The system of claim 18, wherein the CSWM and the network manager are each running on at least one of a gateway and a host computer.

31. The system of claim 30, wherein the CSWM directs at least one of the gateway or the host computer to display the values representing the received RF power measurements on the assigned RF channel on a multipoint gradient map.

32. The system of claim 18, wherein the CSWM:
   monitors the values representing received RF power measurements on the assigned RF channel;
   detects RF interference when at least one of the monitored values exceeds a predetermined value; and
   generates an alert notifying at least one of a system operator and a control or monitoring software application running on a host computer of the RF interference.

33. The system of claim 32, wherein the CSWM further:
   analyzes the values representing received RF power measurements on the assigned RF channel for the detected RF interference;
   creates an RF spectrum signature for the RF interference from the analyzed values;
   compares the RF spectrum signature with a plurality of RF spectrum signatures, each of the plurality of RF spectrum signatures identifying a known source of RF interference, and
   identifies the source of RF interference from the compared RF spectrum signatures.

34. The system of claim 32, wherein the CSWM further:
   analyzes the values representing received RF power measurements and the values representing corresponding times of measurement on the assigned RF channel for the detected RF interference;
   determines a temporal pattern for the RF interference from the analyzed values;
   compares the temporal pattern for the RF interference with a plurality of RF temporal patterns, each of the plurality of RF temporal patterns identifying a known source of RF interference, and
   identifies the source of RF interference from the compared RF temporal patterns.

35. The system of claim 18, wherein the values representing received RF power measurements determined by each wireless device are statistical values for the assigned RF channel, wherein the statistical values comprise at least one of maximum, minimum, average, standard deviation, and variance values.

36. The system of claim 35, wherein the CSWM:
   compares the statistical values and the corresponding times of measurement for the assigned RF channel from at least two of the plurality of wireless devices, wherein at least two of the plurality of wireless devices are at locations known to the CSWM;
   determines two possible locations of a source of RF interference on the assigned RF channel from the compared statistical values and times and from the known locations of the at least two of the plurality of wireless devices;
   compares non-RF interference characteristics of the two possible locations of the source of RF interference on the assigned RF channel to determine a location of the source of RF interference; and
   reports the location of the source of the RF interference to at least one of a system operator and a control or monitoring software application running on a host computer.

37. The system of claim 35, wherein the CSWM:
   compares the statistical values and the corresponding times of measurement for the assigned RF channel from at least three of the plurality of wireless devices, wherein at least three of the plurality of wireless devices are at locations known to the CSWM;
   determines a location of a source of RF interference on the assigned RF channel from the compared statistical values and times and from the known locations of the at least three of the plurality of wireless devices; and
   reports the location of the source of the RF interference to at least one of a system operator and a control or monitoring software application running on a host computer.

38. The system of claim 37, wherein the locations of the at least three of the plurality of wireless devices known to the CSWM are fixed locations.

* * * * *